United States Patent
Kormann et al.

(10) Patent No.: US 8,317,578 B2
(45) Date of Patent: Nov. 27, 2012

(54) DISCHARGE ARRANGEMENT WITH A MEASURING DEVICE

(75) Inventors: Georg Kormann, Homburg (DE); Marcus Hettiger, Saarbrücken (DE); Eric Pellegrini, Forbach (DE); Steffen Clauss, Rieschweiler-Mühlbach (DE); Werner Flohr, Kaiserslautern-Dansenberg (DE)

(73) Assignee: Deere & Company, Moline, IL (US)

( * ) Notice: Subject to any disclaimer, the term of this patent is extended or adjusted under 35 U.S.C. 154(b) by 2381 days.

(21) Appl. No.: 11/072,890

(22) Filed: Mar. 4, 2005

(65) Prior Publication Data

US 2005/0195406 A1  Sep. 8, 2005

(30) Foreign Application Priority Data

Mar. 5, 2004  (DE) .................. 10 2004 010 772

(51) Int. Cl.
*A01D 17/04* (2006.01)
(52) U.S. Cl. ................. 460/115; 460/7; 73/866.5
(58) Field of Classification Search .............. 56/10.2 R, 56/10.2 B, DIG. 15, 10.2 C; 460/1, 7, 115; 73/323–334, 431, 866.5, 865.9; 374/120, 374/121, 149
See application file for complete search history.

(56) References Cited

U.S. PATENT DOCUMENTS

| | | | | |
|---|---|---|---|---|
| 3,610,252 A | * | 10/1971 | De Coene et al. ............. | 460/1 |
| 4,068,223 A | * | 1/1978 | Steffen ........................ | 340/608 |
| 5,235,168 A | * | 8/1993 | Bobba ...................... | 235/462.43 |
| 5,256,873 A | * | 10/1993 | Turner et al. ................. | 250/239 |
| 6,100,526 A | * | 8/2000 | Mayes ..................... | 250/339.11 |
| 6,254,008 B1 | * | 7/2001 | Erickson et al. ............ | 236/44 A |
| 6,421,990 B1 | * | 7/2002 | Ohlemeyer et al. ......... | 56/10.2 R |
| 6,640,657 B1 | * | 11/2003 | Smith et al. ................. | 73/866.5 |
| 2005/0085283 A1 | | 4/2005 | Kormann et al. | |

FOREIGN PATENT DOCUMENTS

| | | |
|---|---|---|
| DE | 695 12 165 | 9/1999 |
| DE | 102 36 515 | 8/2002 |
| DE | 102 04 702 | 8/2003 |
| DE | 697 28 587 | 1/2004 |
| EP | 0 931 445 | 7/1999 |
| EP | 1 053 671 | 3/2000 |
| WO | WO 99/40419 | 2/1998 |
| WO | WO 99/46971 | 3/1998 |
| WO | WO 00/00818 | 6/1999 |

OTHER PUBLICATIONS

German Search Report, Mar. 8, 2007, 4 Pages.

* cited by examiner

*Primary Examiner* — Alicia Torres

(57) ABSTRACT

A discharge arrangement of an agricultural harvesting machine comprises a retaining arrangement, a housing removably mounted onto the retaining arrangement, and a measuring device mounted within the housing. The measuring device is adapted to detect properties of the harvested crop. A cover arrangement is pivotably mounted onto the retaining arrangement to enclose the housing and the measuring device such that the housing and the measuring device are positioned between the cover arrangement and the discharge arrangement.

9 Claims, 3 Drawing Sheets

DISCHARGE ARRANGEMENT WITH A MEASURING DEVICE

FIELD OF THE INVENTION

The invention concerns a discharge arrangement of an agricultural harvesting machine, with a retaining arrangement by means of which a measuring device can be attached to the discharge arrangement so that it can be removed, that is arranged in a housing for the detection of properties of the harvested crop.

BACKGROUND OF THE INVENTION

As a rule measuring devices appropriate for analysis of the material contents of organic material include sensors that operate in the region of the wave lengths of the near infra-red (NIR), they are equipped with light sources and optical analyzers. Such sensors are relatively costly and expensive.

Measuring devices of this type are described by WO 99/46971 A, WO 99/40419 A, WO 00/00818 A and DE 102 36 515 C. They are arranged within the supporting superstructure of the harvesting machine adjacent to a conveying channel in which harvested crop is conveyed. Since the measuring devices arranged there are protected relatively well against environmental hazards, more stable protective housings for protection against environmental hazards can be omitted.

Such a measuring device is described by EP 1 053 671 A, that is attached to an agricultural harvesting machine. The harvested crop flows past the measuring device and is examined by the measuring device in regard to certain properties, such as moisture content or the proportion of organic materials contained. In one embodiment the measuring device is fastened to the discharge arrangement of a harvesting machine. The measuring device can be removed in order to use it on another harvesting machine. A similar, removable measuring device is shown by DE 103 48 040 A published subsequently. Here the disadvantage is seen in the fact that when the measuring device is attached to the discharge arrangement it is directly exposed to environmental hazards. In unfavorable cases, for example, during operation underneath trees at the edge of the field, the measuring device can also be damaged.

The problem underlying the invention is seen in the need to avoid the disadvantages described.

SUMMARY OF THE INVENTION

This problem is solved according to the invention by the teaching of patent claim 1, where the further patent claims cite characteristics that further develop the solution to great advantage.

It is proposed that a retaining arrangement be attached to the outside of the discharge arrangement. The measuring device, arranged in a housing, is attached to the retaining arrangement so it can be removed, so that the measuring device is positioned on the discharge arrangement when it is mounted. The retaining arrangement is equipped with a cover arrangement that is used to cover the outer surface of the housing which is spaced away from the discharge arrangement. Thereby the housing of the measuring device is located between the cover arrangement and the discharge arrangement in its attached condition.

In this way the result is that the cover arrangement provides an additional protection to the measuring device. It is protected against environmental hazards, such as direct sunlight, precipitation and mechanical effect. Thereby an undesirable heating or damage to the measuring device should not present a problem.

In principle it would be conceivable to connect the cover arrangement rigidly with the discharge arrangement. The cover arrangement could be, for example, U-shaped so that the measuring device could be slid into it. Then, however, only a limited access is possible to the region of the discharge arrangement under the cover arrangement so that any windows or the like arranged there would be difficult to clean. Therefore, in a preferred embodiment of the invention, the cover arrangement can be moved between a first position, in which it covers the discharge arrangement in that area in which the measuring device can be accommodated, and a second position, in which it does not cover the aforementioned area of the discharge arrangement. The result is a better access to the aforementioned area of the discharge arrangement.

The housing of the measuring device can be immobilized on the cover arrangement, so that the measuring device can be moved together with the cover arrangement between the first and the second position. The second position provides good access to the measuring device in order to be able, for example, to clean, maintain it or inspect it. Since the measuring device is immobilized on the cover arrangement (but can be released) there is no danger of it falling to the ground, in contrast to the situation in the case that it is held in the hand by an operator. It would also be conceivable to fasten the housing of the measuring device to the discharge arrangement or to parts of the retaining arrangement that do not move with the cover arrangement and are rigidly connected to the discharge arrangement.

In a preferred embodiment the cover arrangement is connected in joints to the discharge arrangement so that it can pivot. The pivot axis may extend in the longitudinal direction of the discharge arrangement or transverse to it. Alternatively a sliding attachment of the cover arrangement to the discharge arrangement would also be conceivable.

Preferably the measuring device operates optically, for example, in the near infra-red region. Therefore it is appropriate to provide an opening in the discharge arrangement through which the measuring device can interact with the harvested crop that is to be examined. In order to protect the measuring device from intruding harvested crop, an obvious solution is the attachment of a pane of an appropriate, transparent material in the opening. This pane prevents any escape of the harvested crop from the opening even when the measuring device is removed. The pane can be immobilized by a seated bushing located between the pane and the edge of the opening of the discharge arrangement. The use of a seal between the measuring device and the bushing is proposed in order to provide sealing against scattered light and light from the surroundings. The bushing can be removed along with the pane in order to prevent any unnecessary wear of the pane.

Finally it is proposed that the housing of the measuring device be attached to the retaining arrangement so that it can be repositioned. Thereby the measuring device can be brought into an optimum position.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE EMBODIMENTS

Figure 1:
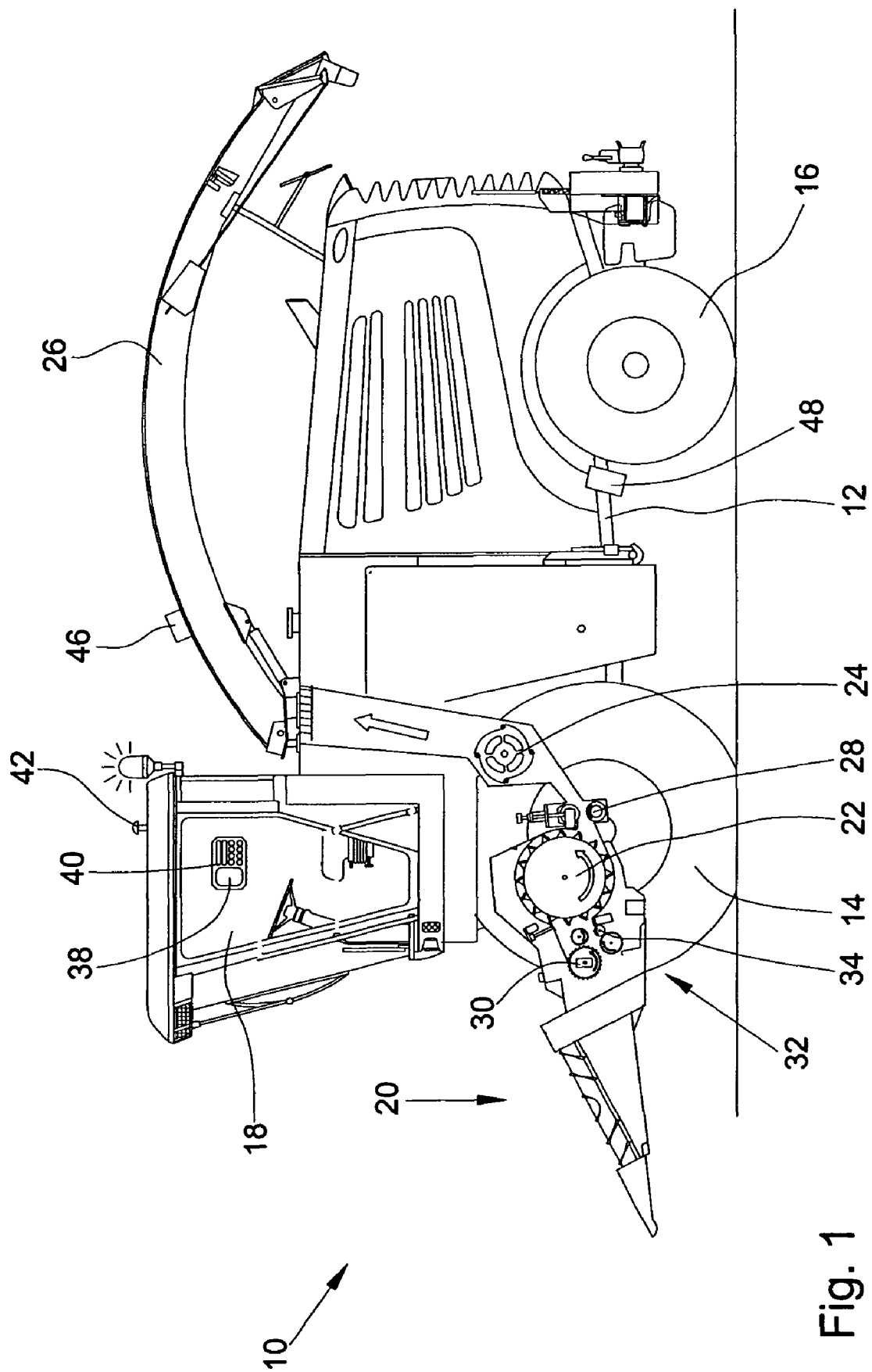
FIG. 1 shows a schematic side view of a harvesting machine with a measuring device.

A harvesting machine 10 in the form of a self-propelled forage harvester shown in FIG. 1 is supported on a frame 12 that is carried by front and rear wheels 14 and 16. The operation of the harvesting machine 10 is controlled from an operator's cab 18 from which a harvested crop recovery arrangement 20 can be observed visually. In the embodiment shown the harvested crop recovery arrangement 20 is a corn head, crop taken up from the ground by it, for example corn, grass or the like, is conducted to a chopper drum 22 that chops it into small pieces and delivers it to a conveyor arrangement 24. The crop leaves the harvesting machine 10 to an accompanying trailer over a discharge arrangement 26 comprising a duct which is U-shaped in cross section and is mounted for being selectively rotated about an upright axis. A post-chopper reduction arrangement 28 extends between the chopper drum 22 and the conveyor arrangement 24 through which the crop to be conveyed is conducted tangentially to the conveyer arrangement 24.

Several sensors are provided on the harvesting machine 10 shown in FIG. 1 for the measurement of the flow of the harvested crop flowing through the harvesting machine 10 per unit of time, the so-called throughput. A first throughput sensor 30 measures the distance between two rough pressing rolls 32 that are arranged between the harvested crop recovery arrangement 20 and the chopper drum 22, and between which the harvested crop is conveyed, the distance is measured by means of a sliding or rotary resistance (potentiometer) actuated by the spring-suspended rough pressing rolls 32. Moreover, the rotational speed of one of the rough pressing rolls 32 is measured by means of a second sensor 34. In addition sensors can measure the drive torque of the conveyor arrangement 24 as well as that of the post-chopper reduction arrangement 28.

An on-board computer 40 connected to a display arrangement 38 is used to record and evaluate the measured data.

In order to obtain the value of the yield, additional information is required regarding the actual operating velocity and the operating width of the machine. The operating velocity can be derived from data of the forward propulsion arrangements of the harvesting machine 10 or detected by a radar sensor 48. The yield can be mapped specific to partial areas by the on-board computer 40 by means of a GPS sensor 42 (global positioning system) for the detection of the actual position.

According to the invention a measuring device 46 is arranged at the discharge arrangement 26 for the measurement of certain materials contained in the harvested crop. It detects the percentage proportion of these materials contained in the harvested crop during the operation and operates optically in reflection mode in the visible range and/or the near infra-red range. Thereby the contents of moisture, raw protein, fat content etc. of the harvested crop can be geo-referenced, stored in the on-board computer 40 and displayed on the display arrangement 38. Furthermore, the measuring device 46 is arranged to detect further parameters of the harvested crop, particularly the fiber length, the fiber contents and the contents of solid matter.

Figure 2:
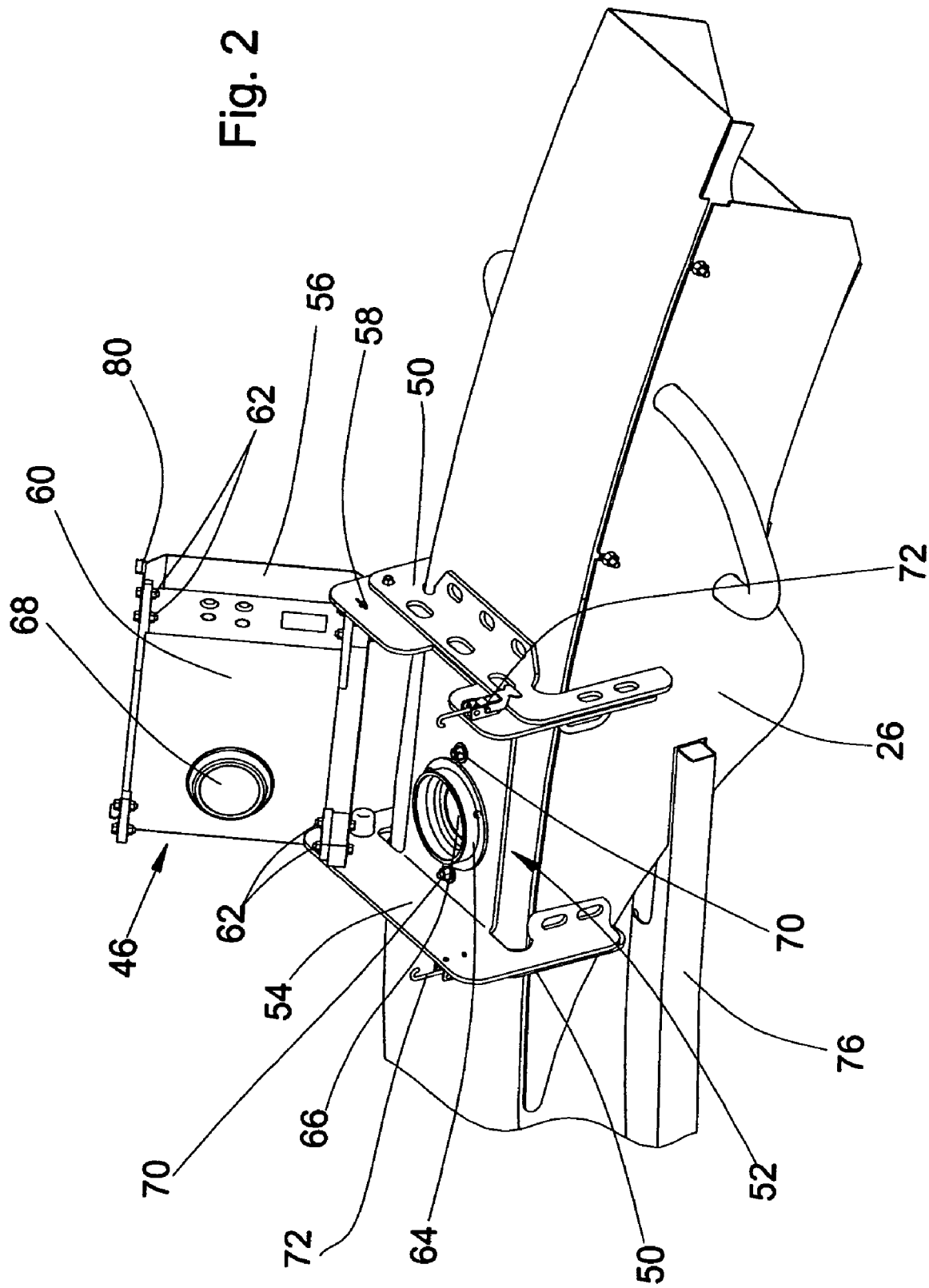
FIG. 2 shows a perspective view of a section of the discharge arrangement of the harvesting machine with a retaining arrangement and a measuring device attached to it in a position that is pivoted outward.

The attachment of the measuring device 46 to the discharge duct arrangement 26 is shown in greater detail in FIG. 2. Two inverted, U-shaped brackets 50 are welded to a top and spaced vertical side walls of the duct of the discharge arrangement 26, at respective locations spaced in the longitudinal direction of the discharge arrangement 26. A retaining arrangement 52 is fastened between the brackets 50. The retaining arrangement is composed of a retaining component 54 welded to the brackets 50, the retaining component 54 extends parallel to the adjoining surface of the duct of the discharge arrangement 26, the retaining arrangement also includes a cover arrangement 56 which is pivoted at a joint, defining a pivot axis 58, from the retaining component 54, all these components are shown in FIG. 2 in their pivoted, position, which is hereinafter referred to as the second position. In addition the retaining component 54 is provided with legs that contain elongated holes with which it is welded to the top or upper wall of the duct of the discharge arrangement 26. The pivot axis 58 of the cover arrangement 56 extends along the longitudinal direction of the discharge arrangement 26. There are also other possible desired fastenings of the retaining component 54 to the discharge arrangement 26.

In the position shown in FIG. 2 the cover arrangement 56 has a cross section in the form of an inverted U. A housing 60 is arranged between the legs, at its sides it contains the measuring device 46. The housing 60 is immobilized by a total of eight screws 62 so that it can be removed from the side legs of the cover arrangement 56. The screws 62 extend through elongated holes in retaining devices connected to the housing that permit a fine justification of the position of the housing 60 on the discharge arrangement 26.

An opening is provided on the upper wall of the discharge duct of the discharge arrangement 26 that is congruent and aligned with an opening in the retaining component 54. A circular bushing 64 is arranged in these openings into which a pane 66 is attached with adhesive e, the pane preferably consists of sapphire glass. On its underside that is arranged in the interior of the upper wall of the duct of the discharge arrangement 26 that conducts the harvested crop, the bushing 64 is equipped with a ceramic coating in order to avoid the wear of the bushing 64 brought about by the abrasion from the harvested crop. The pane 66 is transparent to the radiation in the wave length range used by the measuring device 46. A sensor surface 68 is arranged on the measuring device 46 in such a way that it is arranged centrally to the pane 66 when the cover arrangement 56 is pivoted into a closed position, hereinafter referred to as the first position. The central positioning of the sensor surface 68 is made more favorable by a funnel-shaped section 78 on the interior of the bushing 64. Further means may be provided for the orientation of the measuring device 46 on the discharge arrangement 26 or the retaining component 54, for example, pins interacting with openings or the like.

The retaining component 54 is connected by screws 70 with a sheet metal wear plate arranged on the inner side of the discharge arrangement 26, that is located on the inner side of the sheet metal cover of the discharge arrangement 26 shown at the top in FIG. 2. The screws 70 permit a tightening of the sheet metal wear plate to the sheet metal cover of the discharge arrangement 26. The wear plate has an opening that is congruent to and aligned with the cover plate in the discharge arrangement 26 and in the retaining component 54. In another embodiment the upper side of the discharge arrangement 26 shown at the top in FIGS. 2 and 3 or a part of it is formed by the sheet metal wear plate; thereby the sheet metal cover can be omitted entirely or in part. Then the screws 70 connect the retaining component 54 directly with the sheet metal wear plate.

On the side of the retaining component 54 spaced away from the axis of rotation 58 end position locking bars 72 are located, with which the cover arrangement 56 can be immobilized in the first position.

Figure 3:
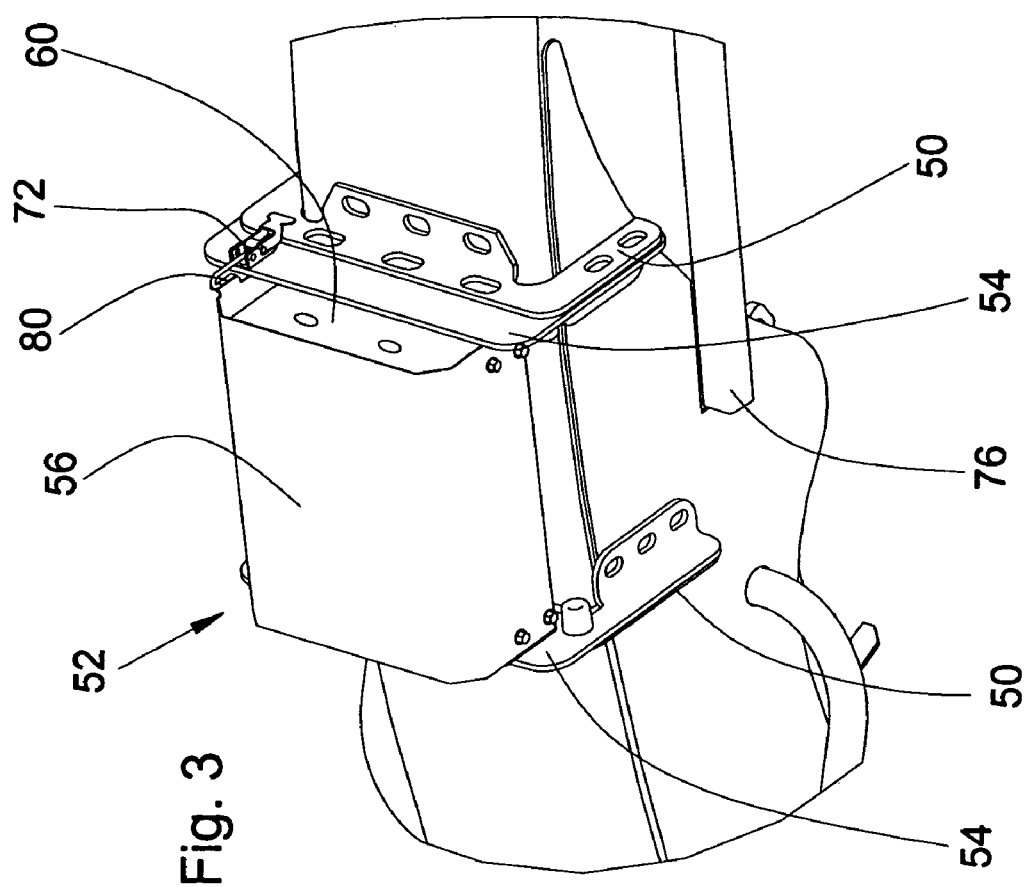
FIG. 3 shows a view of the discharge arrangement of FIG. 2 with a measuring device brought into an operating position.

FIG. 3 shows the area of the discharge arrangement 26 with the cover arrangement 56 brought into the first, closed position. The cover arrangement 56 is fixed in its position by the end position locking bars 72 that reach over associated projecting areas 80 on the cover arrangement 56. The sensor surface 68 of the measuring device 46 is aligned centrally with the bushing 64.

Figure 4:
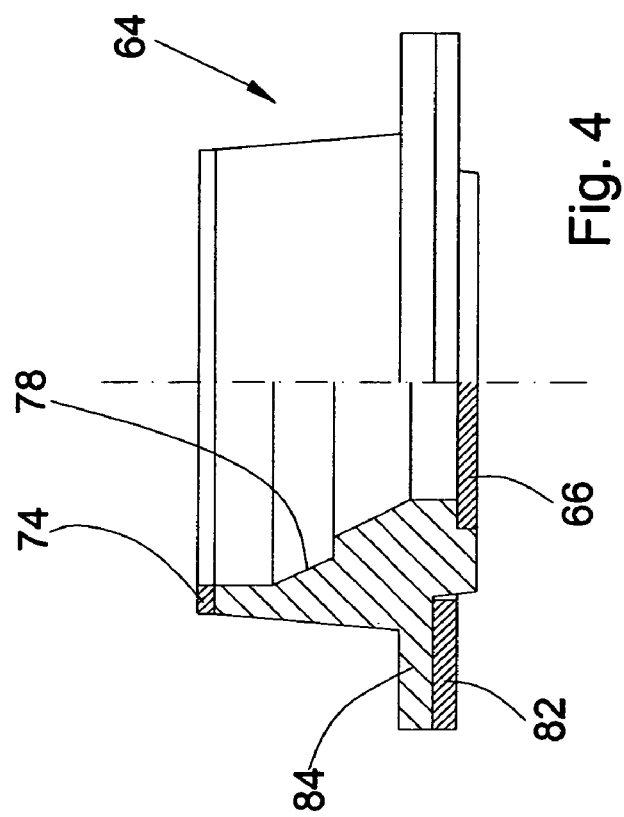
FIG. 4 shows a section through a bushing with a pane and two seals.

As can be seen on the basis of FIG. 4, a seal 74 is located on the upper side of the bushing 64 and thereby between the bushing 64 and the housing 60 of the measuring device 46, the seal 74 consists of an elastic, non-transparent material and prevents any intrusion of scattered light. A further seal 82 is located between the bushing 64 and the adjoining wall of the discharge arrangement 26. The seal 82 is in sealing contact with the flange 84 of the bushing 64 and is offset upward relative to the pane 66, so that the pane 66 projects into the interior of the discharge arrangement 26 beyond the flange 84 and the adjoining areas of the discharge arrangement 26. The bushing 64 is pressed against the discharge arrangement 26 only by the measuring device 46. Therefore in the second position of the cover arrangement (see FIG. 2) the bushing 64 can be taken out of the opening in the discharge arrangement 26. In the first position the measuring device 46 presses the bushing 64 against the discharge arrangement 26 whereby the seals 74, 82 are compressed.

An electronic unit is provided in a manner known in itself within the housing 60 of the measuring device 46, it includes switching elements for the current supply of the measuring device 46, for the evaluation of the measured values and for data transmission over a bus system of the harvesting machine 10. Current is supplied over the bus system whose line, not shown in FIG. 2, is conducted through a cable duct 76. The bus system is connected by a plug-in connection to the measuring device 46. A light source is located within the housing 60, it radiates light downward. The light shines through the pane 66, that is transparent to the range of wave lengths used, into the discharge duct 26, through which harvested crop is conveyed. Light reflected by the harvested crop reaches a detector in the housing 60 of the measuring device 46. The measured values provided by the detector are used by the electronic unit to calculate the proportion of certain material components in the harvested crop, such as moisture content, amylum, enzyme-soluble organic matter, non-organic minerals, raw protein, oil and the like. The measured values are transmitted over the bus system to the on-board computer 40 which maps them specific to the observed location and translates them to the display arrangement 38, on which they can be displayed.

The cover arrangement 56 encloses the housing 60 of the measuring device 46 in the manner of a sandwich and protects these from environmental hazards. Under radiation from sunlight the measuring device 46 does not overheat excessively, and it is protected against rain and mechanical effects. After releasing the end position locking bar 72 an operator is able to bring the cover arrangement 56 with the measuring device 46 from the first position, shown in FIG. 3, into the second position, as is shown in FIG. 2, thanks to the pivoted attachment. At that location the measuring device 46 is easily accessible, but is retained by the cover arrangement 56, so that it cannot fall down unexpectedly and be damaged upon impact with the ground. After removing the screws 62 and releasing the electrical plug-in connection, the measuring device 46 can be removed from the cover arrangement in order to secure it in the evening or after the conclusion of the harvest in a safe place secure against environmental hazards or on another harvesting machine or in order to use it in a stationary application. When the measuring device 46 is uninstalled the bushing 64 with the pane 66 can be removed, in order to avoid unnecessary wear of the pane 66 and the underside of the bushing 64. Then a matching metallic cover piece can be installed and immobilized by means of the screws 70 in place of the bushing 64.

In accordance with the provisions of the patent statutes, the present invention has been described in what is considered to represent its preferred embodiment. However, it should be noted that the invention can be practiced otherwise than as specifically illustrated and described.

What is claimed is:

1. A discharge arrangement of an agricultural harvesting machine comprising:
a duct including a pair of spaced vertical side walls joined by a top wall;
a retaining arrangement fixed to said top wall of said duct;
a housing removably mounted onto the retaining arrangement;
a measuring device mounted within the housing and adapted for detection of properties of harvested crop; and
the retaining arrangement including a cover arrangement, with said cover arrangement being mounted to a remaining portion of said retaining arrangement for movement between a first position, in which the cover arrangement cooperates with said remaining portion of said retaining arrangement so as to enclose the housing and measuring device in a location between the cover arrangement and the top wall of the duct of the discharge arrangement, and a second position displaced from said top wall so as to provide access to said housing and measuring device.

2. The discharge arrangement according to claim 1, wherein the housing and the measuring device are mounted onto the cover arrangement.

3. The discharge arrangement according to claim 1, wherein said retaining arrangement includes fixed retaining components and the cover arrangement is connected in joints to said retaining components and is free to pivot relative to the discharge arrangement.

4. The discharge arrangement according to claim 1, further including an opening, in said top wall of said duct through which the measuring device can interact with the harvested crop being transported therein, and a pane being arranged within the opening.

5. The discharge arrangement according to claim 4, wherein said opening is circular and further including a bushing having a circular cross section and including an end region located in said opening and carrying said pane, said bushing further including an annular flange having a diameter larger than said opening and positioned over said top wall so as to be between the discharge arrangement and the measuring device.

6. The discharge arrangement according to claim 5, further including a seal positioned on a top end of said bushing so as to be between the housing of the measuring device and the bushing.

7. The discharge arrangement according to claim 5, wherein the bushing is removable.

8. The discharge arrangement according to claim 1, wherein the position of the housing is adjustable within the retaining arrangement.

9. The discharge arrangement according to claim 1, wherein the measuring device is an optical measuring device.

* * * * *